United States Patent [19]

Chiodini et al.

[11] Patent Number: 5,502,115
[45] Date of Patent: *Mar. 26, 1996

[54] FLUOROELASTOMER COMPOSITIONS CONTAINING BROMINE AND IODINE IN THE POLYMERIC CHAIN WITH A REDUCED EMISSION OF TOXIC ALKYLHALO COMPOUNDS DURING CURING WITH THE PEROXIDE

[75] Inventors: Graziella Chiodini, Saronno Varese; Anna Minutillo, Milan, both of Italy

[73] Assignee: Ausimont S.r.l., Milan, Italy

[*] Notice: The term of this patent shall not extend beyond the expiration date of Pat. No. 5,399,633.

[21] Appl. No.: 366,775

[22] Filed: Dec. 30, 1994

Related U.S. Application Data

[62] Division of Ser. No. 296,939, Aug. 29, 1994, Pat. No. 5,399,633, which is a continuation of Ser. No. 26,165, Mar. 1, 1993, abandoned, which is a continuation of Ser. No. 798,176, Nov. 26, 1991, abandoned, which is a continuation of Ser. No. 450,466, Dec. 14, 1989, abandoned.

[30] Foreign Application Priority Data

Dec. 16, 1988 [IT] Italy .................................. 22995 A/88

[51] Int. Cl.⁶ ............................................ C08F 8/00
[52] U.S. Cl. .............................................. 525/326.3
[58] Field of Search ............................ 525/326.3, 349, 525/370, 374, 375, 352, 364, 386

[56] References Cited

U.S. PATENT DOCUMENTS

| | | |
|---|---|---|
| 3,344,126 | 9/1967 | Witman . |
| 4,243,770 | 1/1981 | Tatemoto .................... 525/326.3 |
| 4,529,759 | 7/1985 | Ojakaar ............................ 524/83 |
| 4,831,085 | 5/1989 | Okabe ............................. 525/326.3 |

FOREIGN PATENT DOCUMENTS

| | | |
|---|---|---|
| 101930 | 7/1984 | European Pat. Off. . |
| 4024343 | 2/1991 | Germany . |

OTHER PUBLICATIONS

Encyclopedia of Chemical Technology (1982) 3rd Ed. vol. 20, pp. 390–396.
Encyclopedia of Chemical Technology (1979) 3rd Ed. vol. 8, p. 506.
Encyclopedia of Chemical Technology (1980) 3rd Ed. vol. 11, p. 58.

*Primary Examiner*—Christopher Henderson
*Attorney, Agent, or Firm*—Stevens, Davis, Miller & Mosher

[57] ABSTRACT

The emission of the highly toxic volatile products, such as methyl bromides or iodides, or ethyl bromides or iodides, during the cure with peroxides of fluoroelastomers containing bromine or iodine atoms is substantially reduced by adding to the cure mix small amounts of substances capable of combining with the radicals which give rise to the aforesaid toxic products, thereby preventing them from forming. This procedure does not sensibly affect the cure trend and results.

3 Claims, No Drawings

FLUOROELASTOMER COMPOSITIONS CONTAINING BROMINE AND IODINE IN THE POLYMERIC CHAIN WITH A REDUCED EMISSION OF TOXIC ALKYLHALO COMPOUNDS DURING CURING WITH THE PEROXIDE

This is a division of application Ser. No. 08/296,939, filed Aug. 29, 1994, now U.S. Pat. No. 5,399,633 which in turn is a continuation of application Ser. No. 08/026,165, filed Mar. 1, 1993 (abandoned), which in turn is a continuation of application Ser. No. 07/798,176, filed Nov. 26, 1991 (abandoned), which in turn is a continuation of application Ser. No. 07/450,466, filed Dec. 14, 1989 (abandoned).

BACKGROUND OF THE INVENTION (1) Field of the Invention

The present invention is directed to reduction in the emission of highly toxic volatile products, such as methyl bromides or iodides or ethylbromides or iodides, during the cure of fluoroelastomers with peroxides.

(2) Description of the Related Art

The cure with organic peroxides of the fluoroelastomers containing, as cure sites, bromine or iodine atoms along the polymeric chain and/or at the end of same is well known. In said fluoroelastomers, bromine or iodine are introduced into the elastomeric macromolecule by using, in the polymerization step, brominated or iodidated comonomers such as in particular fluorobrominated olefins, brominated or iodidated fluorovinyl ethers, or by using in the polymerization brominated or iodidated compounds such as chain transferors.

In the peroxide cure, use is generally made of organic peroxides of the aliphatic or cycloaliphatic type, or saturated or unsaturated alkylaromatics, such as for example:
2,5-dimethyl-2,5-di(ter.butylperoxy)hexene-3
2,5-dimethyl-2,5-di(ter.butylperoxy)hexane
dicumylperoxide
ter.butylperbenzoate
ethyl-3,3-di(ter.butylperoxy)butyrate
1,1-bis(ter.butylperoxy)3,3,5-trimethylcyclohexane
which give rise, in the cure process, to the formation of methyl or ethyl radicals. These radicals, when combining with the bromine or iodine contained in the fluoroelastomer, can give rise to the above-mentioned methyl or ethyl bromides or iodides, which are highly toxic and probably also cancerogenous volatile products.

Therefore, while the cured articles produced by means of peroxide cure of fluoroelastomers containing bromine or iodine exhibit excellent properties and characteristics at least partially higher than those of the fluoroelastomers cured by means of iones, the peroxide cure of the abovesaid products involves a serious hazard for the health of the operators and espress prohibition of such processing in the next future from the competent authorities is considered as possible.

SUMMARY OF THE INVENTION

Thus, it is an object of the present invention to obviate the above-mentioned serious drawback by adding to the cure mix a substance capable of substantially reducing the emission of methyl or ethyl bromides or iodides during the cure.

In fact, it has surprisingly been found that certain substance types introduced into the mix in a moderate amount, generally ranging from 0.1 to 3 parts by weight for 100 parts by weight of fluoroelastomer, are capable of substantially reducing the emission of said toxic products without sensibly altering the cure trend or the characteristics of the resulting vulcanizate. The action mechanism of the additives according to the present invention is probably based on the fact that they are capable of combining with the methyl or ethyl radicals deriving from the organic peroxide, thereby forming new radicals capable of continuing the cross-linking reaction, so preventing any formation of methyl or ethyl bromides or iodides. However, on the basis of such assumption it is not possible to foresee which substances are actually suited as additives according to the invention: in fact, many substances which are surely capable of blocking the methyl and ethyl radicals and which drastically reduce the emission of the abovesaid bromides and iodides, negatively interfere with the cure process, causing it to become extremely slow and inefficacious and giving rise to vulcanizates of very bad quality.

DESCRIPTION OF THE PREFERRED EMBODIMENTS

The products suited as additives according to the present invention are the ones belonging to the following classes:
a) Benzothiazole and derivatives thereof of general formula:

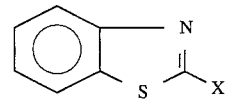

wherein:
X represents H, —SH,

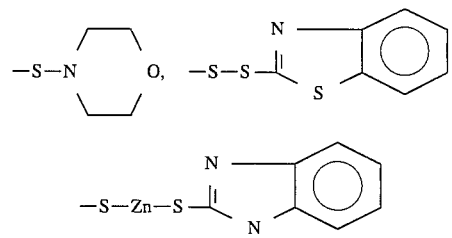

in particular benzothiazole, 2-mercaptobenzothiazole, benzothiazole disulphide, morpholin-2-benzothiazole sulphenamide, zincmercapto-benzothiazole.

b) Maleamide derivatives of general formula:

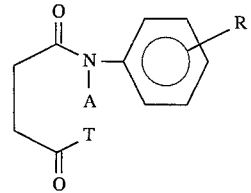

wherein
A=H, or together with T forms a bond, T represents —OH,

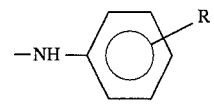

or together with A forms a bond;
R represents H, alkyl with 1 to 6C, halogen, —NO$_2$ and when T forms a bond together A, R may be also

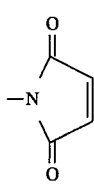

c) Thiurams derivatives of general formula:

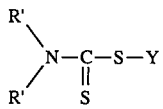

wherein Y represents

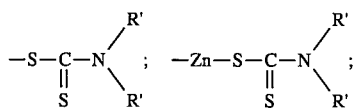

R' represents alkyl with 1 to 4C, in particular tetraalkylthiuram disulphide, zincdiethyldithiocarbamate.

d) Diphenylguanidine derivatives of general formula:

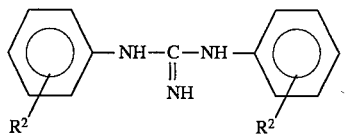

wherein $R^2$ represents H, alkyl with 1 to 6C, in particular the compounds wherein $R^2$ represents H or $CH_3$. Moreover other compounds such as maleic anhydride, diarylformamidines and the derivatives of diazo- and triazodicyclodecenes are resulted to be suited as additives.

The additives according to the present invention, when used in amounts generally ranging from 0.1 to 3 parts by weight for 100 parts by weight of elastomer (p.h.r.) and in particular from 0.2 to 2 p.h.r., beside sensibly reducing the emission of the toxic products methyl or ethyl bromide or iodide, in some cases also by 90%, impart to the curable composition the following characteristics:

increase of the time which is necessary for the scorching to occur (scorching time) and, by consequence, a higher processing safety;

decrease of the Mooney viscosity of the mix and therefore an improved processability;

moderate influence on the cross-linking rate and yield at 180° C.

All the additives indicated hereinbefore can be prepared according to known methods described in the technical literature.

The fluoroelastomers, to which the present invention is applicable, are all those which contain bromine or iodine atoms ascure sites.

Among the most known, the following are to be cited: copolymers of $CH_2=CF_2$ with $CF_3\text{-}CF=CF_2$ and optionally also with $C_2F_4$ with perfluorovinylethers, containing little amounts of bromine or iodine which are introduced by copolymerizing a little amount of brominated or iodidated monomer such as brominated olefins, perfluorobromoalkylperfluorovinylethers, or also by using chain transferors consisting of bromo- or iodo-alkyl compounds.

The mixes based on fluoroelastomers curable with peroxides, which can be additioned according to the present invention comprise, beside the organic peroxide, conventional ingredients such as carbon black and other reinforcing fillers, peroxide curing co-agents (for example triallyl isocyanurate), metal oxides or hydroxides (for example PbO, ZnO), and processing aids.

The following examples are given merely to illustrate but not to limit the present invention.

The evaluation of the $CH_3Br$ emission under curing conditions was generally carried out according to the following method:

MODALITIES FOR DOSING THE $CH_3BR$ EMISSION 20 g of a finely particled mix (polymer+fillers) are treated at 180° C. in a closed reactor, for 30 minutes at a pressure of 0.5 kg/cm² abs. in a nitrogen atmosphere.

Then the mix is cooled to 40°–50° C. and, as an interior standard, 1 cc of A114 ($C_2Cl_2F_4$, b.p.=4° C.) is added.

The gas phase is mixed and subjected to gaschromatographic analysis.

| Column: | POROPAK Q |
|---|---|
| T = | 100° C. |

In example 2, conversely, the actual emission occurring under practical curing conditions at 170° C. is determined by determining the $CH_3Br$ in air samples withdrawn above the mold.

Utilized elascomer:

P.1 terpolymer of $CH_2=CF_2$ 66.2% by moles, $C_3F_6$ 18.2%, $C_2F_4$ 15.2%, containing bromoperfluoroethylvinylether in an amount equal to 0.65% by weight of bromine.

P.2 terpolymer of $CH_2=CF_2$ 54.1% by moles, $C_3F_6$ 22.2%, $C_2F_4$ 22.9%, containing bromoperfluoroethylvinylether in an amount equal to 0.54% by weight of bromine.

The ingredients of the mixes, besides the additive according to the invention, are, in parts by weight for 100 parts by weight of terpolymer, the following:
2,5-dimethyl-2,5-di-ter.butyl-peroxy-hexane at 45% on inert filler (Luperco 101XL), 3 parts;
triallyl isocyanurate (TAIC) at 75% on inert filler, 4 parts;
PbO, 3 parts;
carbon black MT, 30 parts.

The evaluation of the cure trend is carried out by determining the Δ torque (MH-ML) by means of an ODR oscillating disc rheometer (Monsanto type) according to standard ASTM D 2084/81.

Measuring is effected at 180° C., the maximum torque MH is determined after 12 minutes, by "arc 3".

EXAMPLE 1

The tests were carried out using terpolymer P.1.

The elastomer without the additive of the invention provided during curing a Δ torque equal to 71.

In some tests, the low reduction of the $CH_3Br$ emission was due to the insufficient amount of additive: by increasing said amount within the above-cited range, it is possible to improve the effect (see for example tests 7 and 8).

Test 21 is a comparison test and represents the case of products which drastically reduce the $CH_3Br$ emission, but at the same time they prevent or strongly reduce the cure.

TABLE 1

| TEST No. | ADDITIVE | PHR ADDITIVE | Δ TORQUE MH-ML (STANDARD = 71) | % REDUCTION OF $CH_3Br$ EMISSION |
|---|---|---|---|---|
| 1 | maleanilic acid (N-phenyl maleamic acid) | 1.65 | 60 | 72% |
| 2 | maleic anhydride | 0.5 | 65 | 26% |
| 3 | N-(4-methylphenyl)maleimide | 1.60 | 70 | 17% |
| 4 | N-(4-chlorophenyl)maleimide | 1.80 | 68 | 34% |
| 5 | N-(4-nitrophenyl)maleimide | 0.5 | 71 | 31% |
| 6 | N-(1-naphthyl)maleimide | 1.92 | 72 | 31% |
| 7 | N,N'-(1,4-phenylene)bismaleimide | 1.15 | 64 | 35% |
| 8 | N,N'-(1,4-phenylene)bismaleimide | 0.77 | 66 | 17% |

TABLE 1-continued
| TEST No. | ADDITIVE | PHR ADDITIVE | Δ TORQUE MH-ML (STANDARD = 71) | % REDUCTION OF CH₃Br EMISSION |
|---|---|---|---|---|
| 9 | 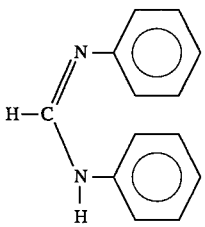 | 1.68 | 51 | 77% |
| 10 | 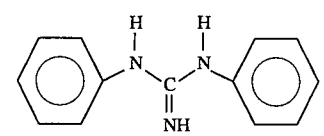 | 0.9 | 59 | 57% |
| 11 | 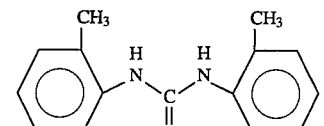 | 1.0 | 60 | 51% |
| 12 | 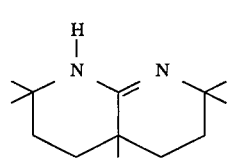 | 1.8 | 52 | 84% |
| 13 | 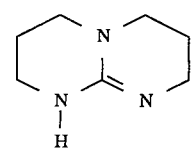 | 1.2 | 51 | 86% |
| 14 | 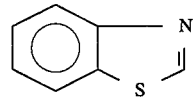 | 0.5 | 65 | 28% |
| 15 | 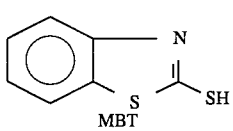 MBT | 0.5 | 70 | 70–80% |
| 16 | 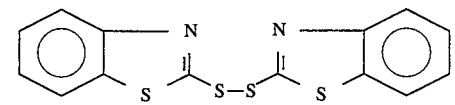 | 0.5 | 71 | 70–90% |
| 17 | 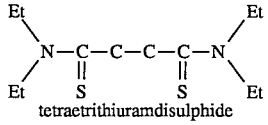 tetraetrithiuramdisulphide | 0.5 | 68 | 90% |
| 18 | 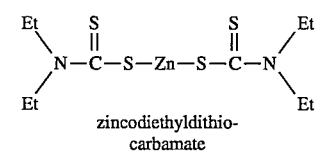 zincodiethyldithio-carbamate | 0.5 | 67 | 87% |

TABLE 1-continued

| TEST No. | ADDITIVE | PHR ADDITIVE | Δ TORQUE MH-ML (STANDARD = 71) | % REDUCTION OF CH₃Br EMISSION |
|---|---|---|---|---|
| 19 | 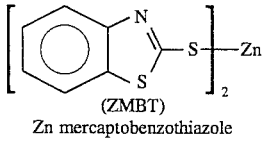<br>(ZMBT)<br>Zn mercaptobenzothiazole | 0.5 | 72 | 61% |
| 20 | 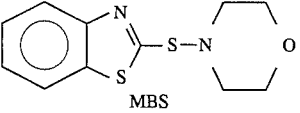<br>MBS<br>Morpholine 2-benzothiazole sulphenamide | 0.5 | 80 | 79% |
| | FOR COMPARISON | | | |
| 21 | 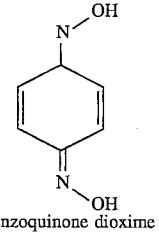<br>Benzoquinone dioxime | 0.6 | 8 | 90% |

EXAMPLE 2

Test were carried out in order to check the correspondence between the CH₃Br reduction determined by means of the laboratory test described for example 1 and the actual reduction achieved in the curing process in mold at 170° C. under actual conditions, determined by analysis of an air sample withdrawn above the molded article immediately after having drawn the vulcanizate from the mold. The additive utilized was mercaptobenzothiazole disulphide (MBTS); a test was carried out without the additive in order to have a comparison of the values of the Δ torque and of the CH₃Br emission.

The elastomer utilized was of the type P.2 described hereinbefore.

The results are the average of analytical determinations on 5 air drawings.

TABLE 2

| ADDITIVE | PHR | Δ MM-ML | PERCENT REDUCTION OF CH₃Br EMISSION LABORATORY TESTS | PERCENT REDUCTION OF CH₃Br EMISSION MOLDING TESTS |
|---|---|---|---|---|
| — | — | 62 | — | — |
| MBTS | 0.25 | 64 | 79% | 62% |
| MBTS | 0.5 | 66 | 85% | 98% |

EXAMPLE 3

Characterization of the curable mixes and of the vulcanized product.

The characteristics compared with those of the nonadditivated products are reported in the following tables.

In particular, from table 3 it is apparent that the mixes containing the additive according to the invention exhibit a remarkably higher scorching timen, a decrease of the Mooney scorch viscosity (at 135° C.) and a decrease of the Mooney viscosity at 121° C.; these characteristics are indicative of a better processability of the mix.

Table 4 contains some characteristic values which provide idications about the cure trend.

The characteristics of the cured material are reported in Table 5.

TABLE 3

| | COMPOSITION OF THE MIX (ASTM D. 3182-82) | | | | | ASTM D. 164E-82 | | |
|---|---|---|---|---|---|---|---|---|
| | PARTS BY WEIGHT FOR 100 PARTS BY WEIGHT OF POLYMER | | | | | 121° C. | 135° C. MOONEY | |
| | | additive | | | carbon | MOONEY | SCORCH | |
| Mix No. | polymer | (p. by wg.) | luperco | TAIC | PbO | black MT | ML (1' + 10') | MV | t 15 |
| 1 | P.1 | — | 3 | 4 | 3 | 30 | 86 | 42 | 11' 42" |
| 2 | P.1 | MPM (1.5) | 3 | 4 | 3 | 30 | 84 | 40 | 24' 18" |
| 3 | P.1 | MBT (0.5) | 3 | 4 | 3 | 30 | 74 | 35 | 61' 00" |
| 4 | P.1 | MBTS (0.5) | 3 | 4 | 3 | 30 | 79 | 35 | 60' |
| 5 | P.2 | — | 3 | 4 | 3 | 30 | 110 | 49 | 13' 18" |
| 6 | P.2 | MBTS (0.25) | 3 | 4 | 3 | 30 | 102 | 45 | 26' 24" |
| 7 | P.2 | MBTS (0.5) | 3 | 4 | 3 | 30 | 101 | 43 | 33' 42" |

MPM = 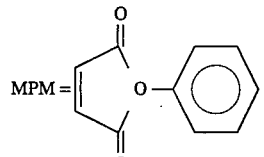

MBT = 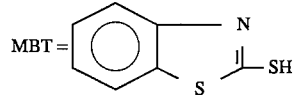

MBTS = 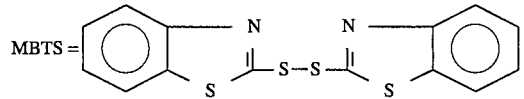

TABLE 4

| | | CURING CHARACTERISTICS ASTM 02084-8, - ODR, 180° C.; arc ± 3 | | | | | | |
|---|---|---|---|---|---|---|---|---|
| POLYMER | Mix No. (from tab. 3) | MI (lbf · in) | MH (lbf · in) | ts 2 (s) | t'50 (s) | t'90 (s) | V max (lbf · in/s) | MH-ML |
| P.1 | 1 | 23 | 82 | 69 | 117 | 243 | 0.75 | 59 |
| P.1 | 2 | 20 | 95 | 75 | 129 | 312 | 1.01 | 75 |
| P.1 | 3 | 16 | 77 | 129 | 219 | 348 | 0.41 | 61 |
| P.1 | 4 | 16 | 81 | 135 | 195 | 303 | 0.7 | 65 |
| P.2 | 5 | 24 | 86 | 69 | 126 | 360 | 0.63 | 62 |
| P.2 | 6 | 19 | 83 | 90 | 144 | 324 | 0.73 | 64 |
| P.2 | 7 | 17 | 83 | 99 | 153 | 330 | 0.80 | 66 |

TABLE 5

| | | MECHANICAL PROPERTIES | | | | | | | | | | | | |
|---|---|---|---|---|---|---|---|---|---|---|---|---|---|---|
| | | after press-cure (170° C. + 10') | | | | | | | after post-cure (250° C. + 24 h) | | | | | ASTM | ASTM |
| | Mix | ASTM D.412-83 | | | | ASTM D.2240-8 Hardness | ASTM D.624-81 Tear-Strength | | ASTM D.412-83 | | | | D2240-81 Hardness | D1414-78 (*) C.S. |
| | No. | Tensile propert. | | | | (points) | 170° C. | | Tensile properties | | | | (points) | (%) |
| POLYMER | (from tab. 3) | (MPa) M100 | (MPa) M200 | (MPa) T.S. | (%) E.B. | H- Shore A | (N//mm) F/s | (J//m) E/s | (MPa) M100 | (MPa) M200 | (MPa) T.S. | (%) E.B. | H- Shore A | O-R 214 |
| P.1 | 1 | 4.3 | 9.9 | 10.8 | 234 | 70 | 3.3 | 11.5 | 5.9 | 14.7 | 15.2 | 189 | 73 | 30 |

TABLE 5-continued

| | | after press-cure (170° C. + 10') | | | | | | | after post-cure (250° C. + 24 h) | | | | | |
|---|---|---|---|---|---|---|---|---|---|---|---|---|---|---|
| | | | | | | | | | | | | | ASTM D2240-81 Hardness | ASTM D1414-78 (*) C.S. |
| | Mix | ASTM D.412-83 | | | | ASTM D.2240-8 Hardness | ASTM D.624-81 Tear-Strength | | ASTM D.412-83 | | | | | |
| | No. | Tensile propert. | | | | (points) | (points) | 170° C. | Tensile properties | | | | (points) | (%) |
| POLY-MER | (from tab. 3) | (MPa) M100 | (MPa) M200 | (MPa) T.S. | (%) E.B. | H-Shore A | (N//mm) F/s | (J//m) E/s | (MPa) M100 | (MPa) M200 | (MPa) T.S. | (%) E.B. | H-Shore A | O-R 214 |
| P.1 | 2 | 3.5 | 10.1 | 12.6 | 240 | 70 | 3.6 | 12.4 | 5.4 | 16.8 | 18.4 | 214 | 73 | 33 |
| P.1 | 3 | 2 | 5 | 8 | 349 | 67 | 3.4 | 14.2 | 4.6 | 13.2 | 14.9 | 219 | 74 | 44 |
| P.1 | 4 | 2.9 | 8.7 | 10.8 | 268 | 68 | 3.6 | 13.2 | 5.0 | 14.5 | 16.1 | 216 | 74 | 42 |
| P.2 | 5 | 3.7 | 8.3 | 11 | 306 | 73 | 4.9 | 28.1 | 5.5 | 15.8 | 18.5 | 227 | 74 | 33 |
| P.2 | 6 | 3.6 | 7.9 | 10.6 | 338 | 72 | 4.6 | 24 | 5.9 | 16.1 | 19.5 | 234 | 76 | 35 |
| P.2 | 7 | 3.7 | 8.1 | 10.9 | 319 | 72 | 4.3 | 22.2 | 5.9 | 16 | 19 | 230 | 76 | 34 |

(*) C.S. = compression set at 200° C. for 70 h.

EXAMPLE 4

The tests reported in Table 6 show that the reduction of the $CH_3Br$ emission and the cure trend vary on variation of the utilized polymer type and of the bromine content.

In all the tests reported in Table 6 the utilized additive was phenylmaleinimide:

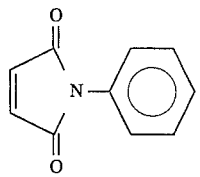

Other components of the mix were:

| Luperco | 3 p.h.r. |
|---|---|
| TAIC | 4 p.h.r. |
| PbO | 3 p.h.r. |
| carbon black | 30 p.h.r. |

TABLE 6

| POLYMER | ADDITIVE P.H.R. | Δ TORQUE MM-ML | % REDUCTION OF $CH_3Br$ EMITTED |
|---|---|---|---|
| P.1 | — | 71 | — |
| P.1 | 1.5 | 76 | 15% |
| P.41 | — | 62 | — |
| P.41 | 1.5 | 55 | 29% |
| P.2 + P.41 (+) mix | — | 65 | — |
| P.2 + P.41 (+) mix | 1.5 | 64 | 37% |

Polymer P.41 contains:

$CH_2=CF_2$ 53,4%; $C_2F_4$ 23,9%; $C_3F_6$ 22,7%, and bromovinylether in an amount equal to 0.93% of Br.

(+) Bromine content of the polymeric mix: Br=0.72%.

What is claimed is:

1. Fluoroelastomeric compositions containing bromine and/or iodine in the polymeric chain as peroxide cure sites, comprising organic peroxides of the aliphatic, cycloaliphatic or alkylaromatic type, either saturated or unsaturated, and an additive in an amount equal to 0.1–3 parts by weight for 100 parts by weight of fluoroelastomer, comprising at least one compound selected from the group consisting of:

a) benzothiazole and derivatives thereof of general formula:

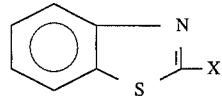

wherein: X represents H, —SH,

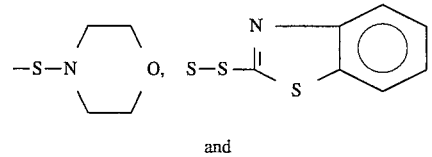

and

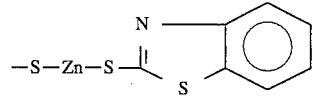

b) maleamide derivatives of the formula:

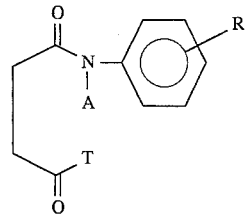

wherein

A=H, and T represents —OH

R represents H, alkyl with 1 to 6 carbon atoms, halogen, —$NO_2$ c) thiuram derivatives of the formula:

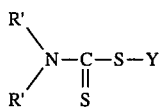

wherein Y represents

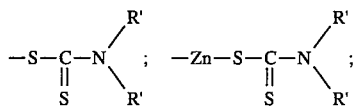

wherein R' represents alkyl with 1 to 4 carbon atoms, d) diphenylguanidine derivatives of formula:

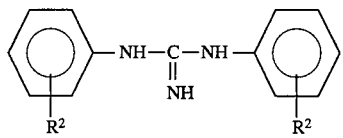

wherein $R^2$ represents H, alkyl with 1 to 6 carbon atoms and e) maleic anhydride, diaryl-formamide and derivatives of diazo and triazo-dicyclodecenes.

2. The fluoroelastomeric compositions according to claim 1, wherein the additive is present in amounts equal to 0.2–2 p.h.r.

3. The fluoroelastomeric compositions according to claim 1, wherein the additive is selected from the group consisting of b) maleamide derivatives of the formula:

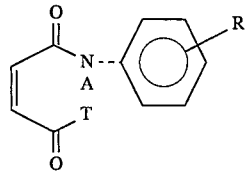

wherein A=H, and T represents —OH, R represents H, alkyl with 1 to 6 carbon atoms, halogen, —$NO_2$ and e) maleic anhydride, diaryl-formamide and derivatives of diazo and triazo-dicyclodecenes.

* * * * *